*INVENTOR*

EDWIN R. KOLB

*BY*

Marechal, Biebel, French & Bugg

*ATTORNEYS*

United States Patent Office 3,514,616
Patented May 26, 1970

3,514,616
RAPID ACCESS CHARACTER MEMORY
Edwin R. Kolb, University Heights, Ohio, assignor to Harris Intertype Corporation, Cleveland, Ohio, a corporation of Delaware
Continuation of application Ser. No. 710,348, Mar. 4, 1968. This application Feb. 26, 1969, Ser. No. 805,105
Int. Cl. G01n 21/30
U.S. Cl. 250—219 19 Claims

ABSTRACT OF THE DISCLOSURE

An optical character memory containing digital information is used in conjunction with a light source and a plurality of photoelectric transducers to produce electrical signals for the generation of alphanumeric characters of typesetting quality on a cathode ray tube for photographic recordation. The digital data representing the single character is divided into a plurality of sections to provide for rapid access to that data. Each of the sections is supplied with digital codes indicating the start of the section, and the coordinates for positioning the cathode ray tube beam within the character field thereby permitting the character to be generated from any sequence of sections making up a complete character.

This is a continuation of application Ser. No. 710,348, filed Mar. 4, 1968, by the present inventor.

BACKGROUND OF THE INVENTION

High speed phototypesetting equipment using cathode ray tubes to display characters on the face thereof employ several different types of devices to form those characters. In one type of character generating system, an electron beam is projected through a selected one of the openings in the character mask to produce a shaped electron beam which is then deflected and directed onto the face of the cathode ray tube at a preselected location. In another character generating system, a core matrix is used to control the intensity of the electron beam which is scanned in a raster pattern on the cathode ray tube face. In a third device, such as the character memory shown in copending U.S. application Ser. No. 591,734, filed Nov. 3, 1966, the characters are generated by controlling the intensity of the cathode ray tube beam in response to digital signals recorded on a cyclically moving storage member.

In the character generating devices of the last mentioned type, the character information may be repeated several times in a single discrete track in order to provide for more rapid access to the stored character information. With such an arrangement, the character memory does not have to rotate through the greater part of a complete rotation in order for a starting place for character generation to pass the read out device. It is still necessary, however, if selection were made after the beginning of the digital information representing the character had just passed the read out device, to wait for the character memory to rotate until the presentation of the beginning of the next representation of that character before character generation could begin.

It has been suggested that more rapid access could be provided by positioning a plurality of read out means circumferentially about the character tracks on the character memory. This type of construction, however, requires an increase in the number of read out heads used with a single character memory and the addition of electronic circuits to select the proper read out head for the most rapid access to the character data.

BRIEF SUMMARY OF THE INVENTION

This invention relates to an improved character memory wherein a character can be generated quickly and with a minimum of delay between the selection of the character and the reading out of the character data and the presentation of that character on a cathode ray tube.

A rotating character memory having digital marks recorded thereon, either optically or magnetically, is rotated at a relatively high speed and the digital information read out at a single location and converted into electrical signals which control a cathode ray tube beam in the formation of a selected character. The data for each character is repeated a number of times in a single discrete track on the memory in order to decrease the access time required to withdraw the character information. A further decrease in access time is accomplished by dividing each of the characters into several sections and providing each of the sections with a unique code representing the coordinates of that section with respect to the remainder of the character, or to the character field, so that a character can be generated from any sequence of sections which make up a complete character. With the apparatus of this invention, access time to the character information is reduced to a minimum and higher speeds of operation of the phototypesetting system are therefore possible.

The decrease in access time may be illustrated by dividing the information representing a character into three sections. Each of the sections may be generated on the face of the cathode ray tube independently of the other, and since the coordinate defining the relative position of the section with respect to the entire character are provided, the character may be formed from any sequence of these sections. By dividing the character into three sections, for example, the access time to the character is reduced by approximately two thirds.

For example, if the beginning of the character had just passed the read out device when the character selection was made, it would be necessary for the character memory to rotate only a distance equal to one section before character generation can begin and not the entire distance required to generate an entire character, as required in prior art devices. Of course, some non-character information is associated with each of the character tracks in order to identify the beginning of each section and the coordinates of that section relative to the remainder of the character. Therefore, the number of sections into which a character may be divided is limited as a practical matter by the amount of non-character information required to identify each section completely.

It is understood that the non-character information associated with each section may be included in the character track itself or supplied from a separate source synchronized with the character track.

This concept of dividing the character into a plurality of sections and identifying the starting coordinates of that section relative to the remainder of the character is novel and may be applied to several types of character generating systems, such as the raster scan type of character generator described in copending U.S. patent application Ser. No. 591,734, referred to above, or to the unit step character generator described in U.S. patent application Ser. No. 710,349, filed Mar. 4, 1968. With the raster scan type of generator, only the X-coordinate information need be supplied to identify the location of a section with respect to the remainder of the character, since the character generator may be made to start with the Y-coordinate coincident with a reference or base line in all cases. With the unit step type of character generator, both the X and Y coordinates ordinarily are given to position that section with respect to the remainder of the character.

It is understood that the X and Y coordinates referred to above are the coordinates indicating the starting position of the section relative to the space occupied by the character, or the character field, and do not refer to the coordinates on the cathode ray tube face itself to position the whole character within a single line. The X and Y coordinates are therefore determined by the character generating signals which move the cathode ray tube beam after it has been positioned in response to the character positioning signals from a control circuit which is responsive in turn to a control record and to the accumulation of spaces resulting from the generation of other characters.

It is therefore an object of this invention to provide a character storage member for use in an apparatus where rapid access to invariant digital information is required where the character is divided into a plurality of sections and other information is supplied to indicate the beginning of each section and its relationship to the remainder of the sections forming that character; and to provide a character generating memory of the type used to direct a beam of energy to form characters where the access time required to recover the digital information for that entire character is substantially reduced by dividing the information representing the character into sections with the beginning of each section being indicated by a digital code identifying the starting coordinates of that section relative to the remainder of the character.

Detailed description

Figure 1:
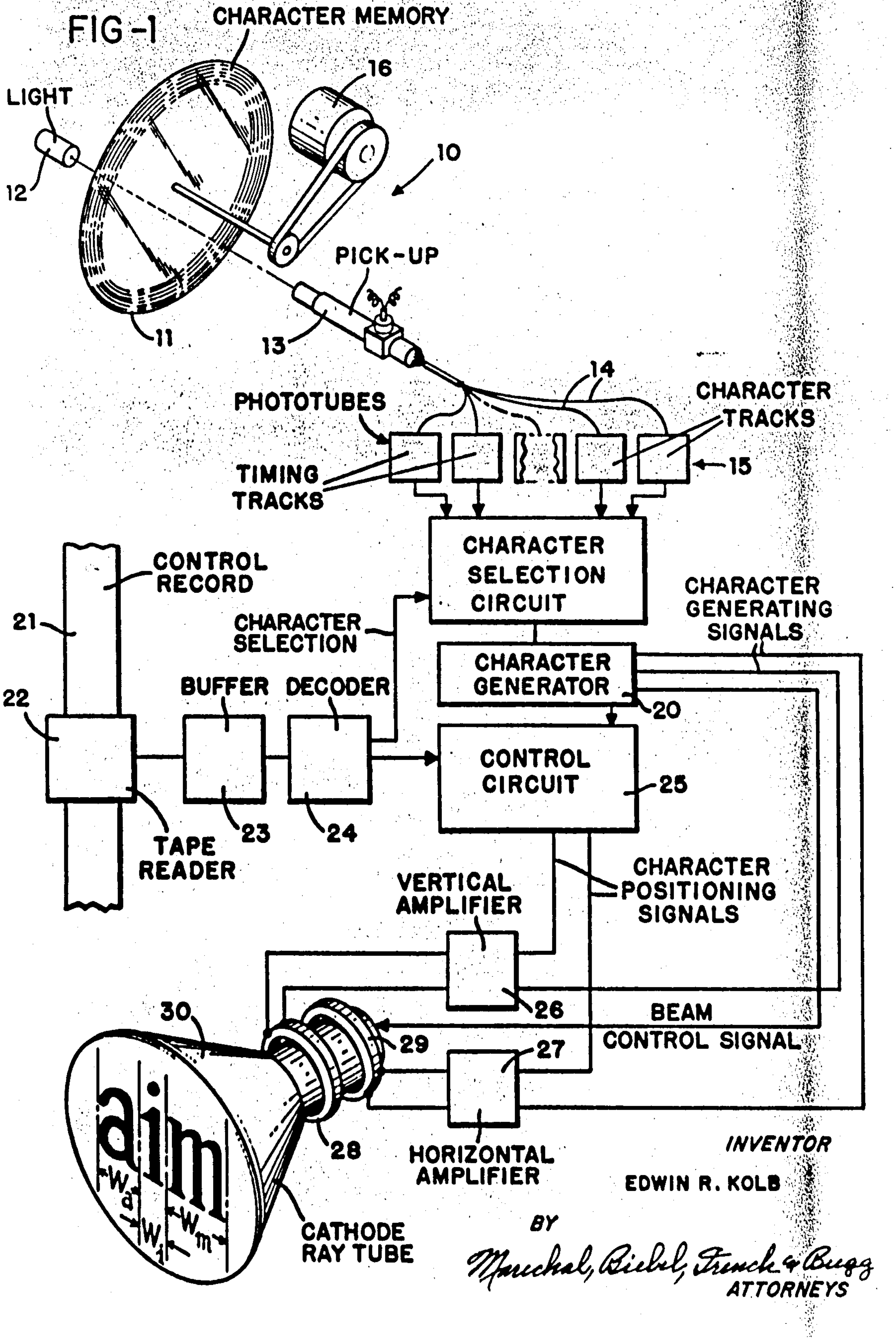
FIG. 1 is a diagrammatic view of a system for generating alphanumeric characters on the face of a cathode ray tube.

Referring now to FIG. 1, which shows a schematic diagram of a device for generating characters on a cathode ray tube of typesetting quality, a character generator for developing a font of characters is shown generally at 10 and may include a transparent memory member 11 onto which is recoded the information necessary to develop a character on a cathode ray tube. The character storage member 11 may be similar in its construction and arrangement of tracks containing character information to that character storage member shown and described in copending United States pat. application Ser. No. 608,161, filed Jan. 9, 1967, assigned to the same assignee as the present invention. In that application, an optically transparent character storage member described contains six bands, with each of the bands containing thirty-five discrete tracks having optical information permanently recorded thereon.

The information contained within the tracks on the member 11 in the form of optical marks is illuminated by a light source 12 and the image of the tracks is projected into a fiber optic pickup assembly 13 where the image is optically magnified and focused onto individual fiber optic bundles and then transmitted by means of optical fibers 14 to a set of photomultiplier tubes 15, one photomultiplier tube for each of the tracks within the band. The character member 11 is rotated by a motor 16 to cause relative movement between the member 11 and the pickup means 13.

In the embodiment described herein, two of the photomultiplier tubes 15 are used to sense the timing tracks and generate electrical signals which are thereafter used to provide timing signals for the remainder of the character forming apparatus. The remainder of the photomultiplier tubes sense the light received from corresponding tracks on the member 11 and the electrical signals produced thereby are used to control the intensity and in some cases the position of the cathode ray tube beam and thus form the characters.

The electrical output of each photomultiplier tube is applied to a character generator circuit 20, the details of which are not disclosed herein but which may take several forms, one of which is described in the above mentioned application Ser. No. 591,734, and shown therein as the character generator 114 in FIGS. 14 and 17 where the cathode ray tube beam is moved in a raster scan pattern. Another type of character generator is described in U.S. patent application Ser. No. 710,349, filed Mar. 4, 1968, where a cathode ray tube beam is moved from point to point to develop the character. It is understood that the invention herein can be used with either of these two character generating systems, at least.

The function of the character generator is to provide the minor deflection voltages or character generating signals used to position the cathode ray tube beam and to supply the necessary signal to control the intensity of the beam and thereby form the image. This is in contradistinction to the major deflection voltages or character positioning signals which position an entire character on the face of the cathode ray tube.

A control record, such as a tape 21, passes through a tape reader 22 and provides electrical signals into a buffer 23. It is recognized that other similar control means such as the output from a computer may supply control signals to the buffer 23. The control record 21 contains such information as character selection, spacing between characters or between words, and leading instructions when used in a typesetting system. The buffer 23 functions to accept information from the control tape at its optimum output rate and then transfer that information into the decoder 24 at a rate which can be accepted by the remainder of the circuit. It is to be understood that different control functions may take differing amounts of time, and even the generation of certain characters takes longer than the generation of other characters. The output of the decoder 24 is applied to a control circuit 25 which in turn generates the character positioning signals for positioning the beam of the cathode ray tube prior to the generation of each character. Selection among the characters within a band is also determined by the output from the decoder 24 through the control circuit.

While only one pickup 13 is shown, it is understood that a single pickup 13 is associated with each of the bands contained on the character member 11, and selection of the pickup to be activated will be made by a coded signal from the control tape.

Both the character positioning and the generating vertical deflection signals are applied to a vertical amplifier 26 while the character positioning and generating horizontal deflection signals are applied to the horizontal amplifier 27. These amplifiers in turn supply the proper current to the vertical and horizontal deflection coils 28 and 29 on the cathode ray tube 30 to position and generate the characters. Thus, the character positioning signals position the beam to locate the character while the character generating signals actually develop the character on the face of the cathode ray tube. When used in a phototypesetting operation, the image of the characters on the cathode ray tube would be recorded by photographic film or paper.

As shown in FIG. 1, different characters in a phototypesetting system normally have different widths. The letter *a* may be assigned a width value of W*a*, while the letter *i* has the width W*i* and the letter *m* has a width W*m*. Each of these width values will depend upon the type and style of the font being generated but normally the characters illustrated in FIG. 1 will have different widths. Accordingly, since the cathode ray tube beam will move to a new position after a character has been generated, the distance through which it moves will be determined by the width of the generated character. In the system described in U.S. patent application Ser. No. 591,734, the width of a character is indicated by the number of horizontal steps required to generate the character when scanning the beam in a raster manner. These horizontal steps were multiplied by the point size of the character and after the character generation was completed, the horizontal character positioning voltage was modified to move the beam in position for the generation of the next character. In the embodiment shown in U.S. patent application Ser. No. 710,349, filed Mar. 4, 1968, a width code is associated with each discrete character track which, when multiplied with the point size of the character, will be used to modify the horizontal character positioning signal to reposition the starting position of the beam for the next character.

Figure 2:
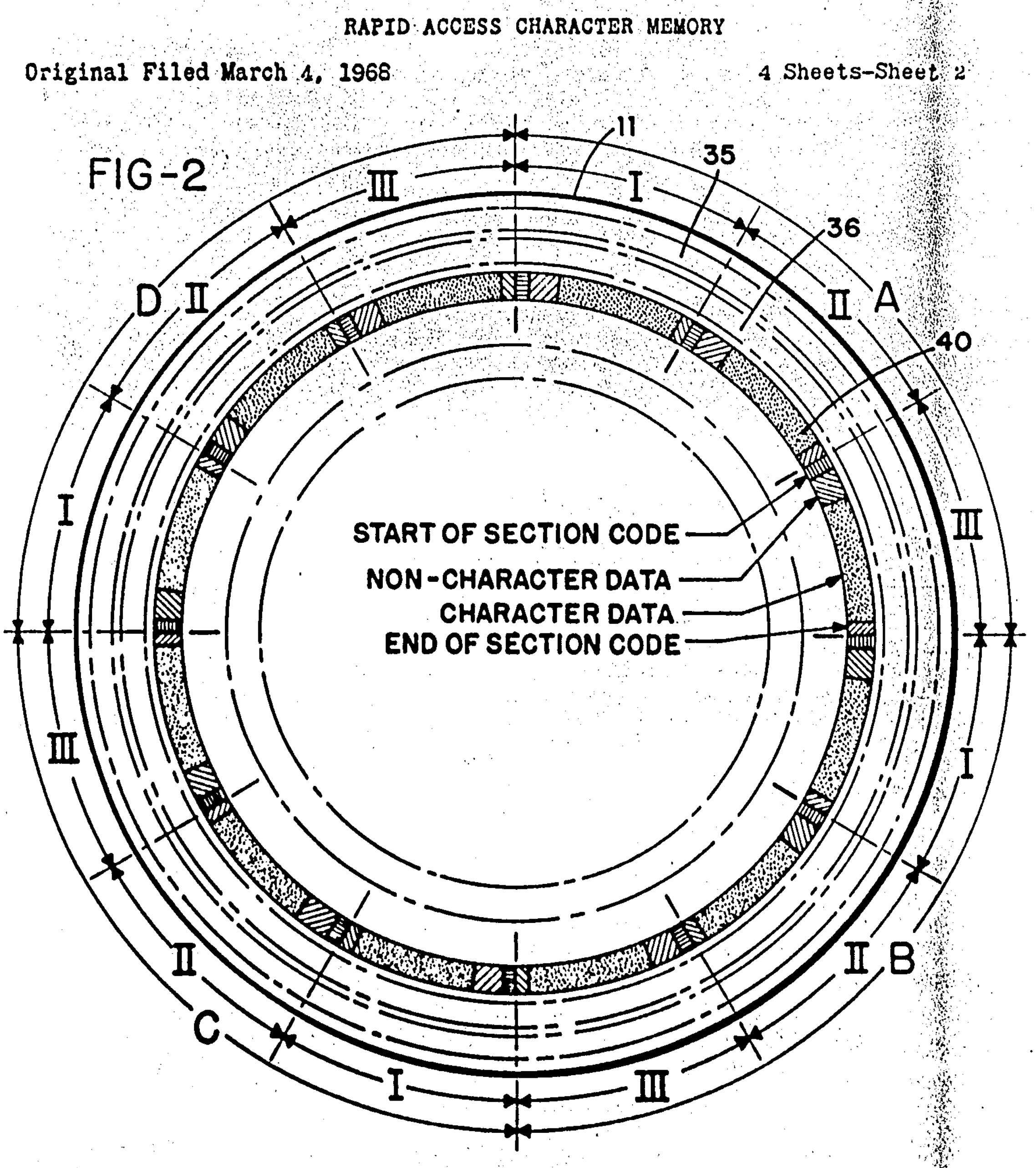
FIG. 2 represents a character memory and illustrates the manner in which the information representing a character is repeated with each repetition being divided into sections.
Figure 3:
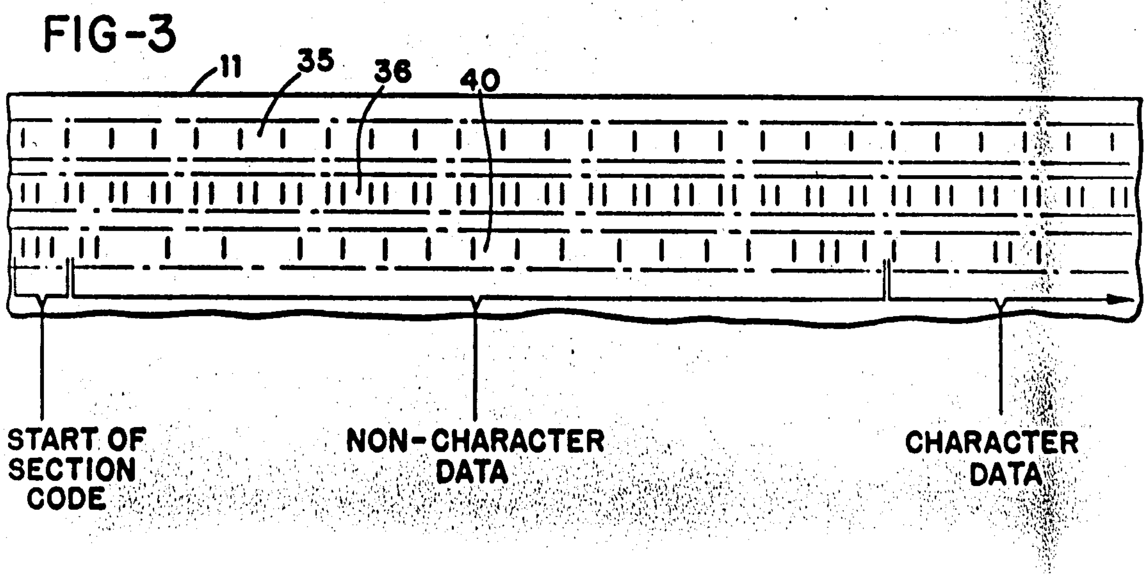
FIG. 3 is an enlarged view of a portion of the character disc shown in FIG. 2, showing two clock tracks and a character track.

Referring now to FIG. 2, the character memory member 11 shown includes a pair of clock tracks 35 and 36, and several character tracks 40. In FIG. 3, a portion of the character member 11 including two clock tracks and a single character track is shown in detail. The digital information for generating a character may be repeated within a single discrete character track 40 several times in order to provide more rapid access to the character data since, in the embodiment shown, only one pickup head is used for each of the bands on the character member.

In FIG. 2, four repetitions of the character are indicated at A, B, C and D. To increase further the accessibility of the character information, each of the repetitions is divided into a plurality of sections, indicated by the numerals I, II and III. While only three sections are shown within each of the repetitions, it is understood that the character information may be divided into any number of sections, and in one embodiment of the invention the character information was actually divided into sixty-four sections. The number of sections into which the character is divided will depend on the amount of information required to generate the character and amount of non-character information in each section.

Each of the sections within a single repetition of a character contains certain functionally similar data, such as a unique code indicating the "start of the section," a group of codes labeled "non-character data," which function in part to identify the starting coordinates of that section with respect to the remainder of the character, "character data" representing the information for the generation of that portion of the character, and an "end of section" code. It is understood that the start of section and end of section codes could be eliminated providing appropriate circuitry were included to sense the occurrence of the non-step data for each of the sections. It has been found, however, that more reliable operation of the character generator is possible if a relatively small amount of space is used to provide unique codes indicating both the start and the end of each section.

With the character member rotating in the direction of the arrow, it is therefore apparent that more rapid access to the character will be obtained if each of the repetitions of the character were divided into several sections since the character can then be generated from any sequence of sections which form a complete character. Thus, if character selection were made while section II of repetition A were passing the fiber optic pickup assembly 13, character generation could begin immediately upon sensing the "start of the section" code of section III in repetition A, and character generation would be completed after the digital data in section III in repetition A, section I of repetition B, and section II in repetition B have been read by the pickup means 13. Therefore, it is not necessary that the sections from only a single repetition be used to form a character but that any sequence of sections from any of the repetitions which form a complete character may be used.

In one modification of this invention, the non-character information being derived from a section is analyzed, and if this non-character information contains errors, that section may be ignored and a corresponding section in a different repetition used to complete the generation of the character.

Figure 4:
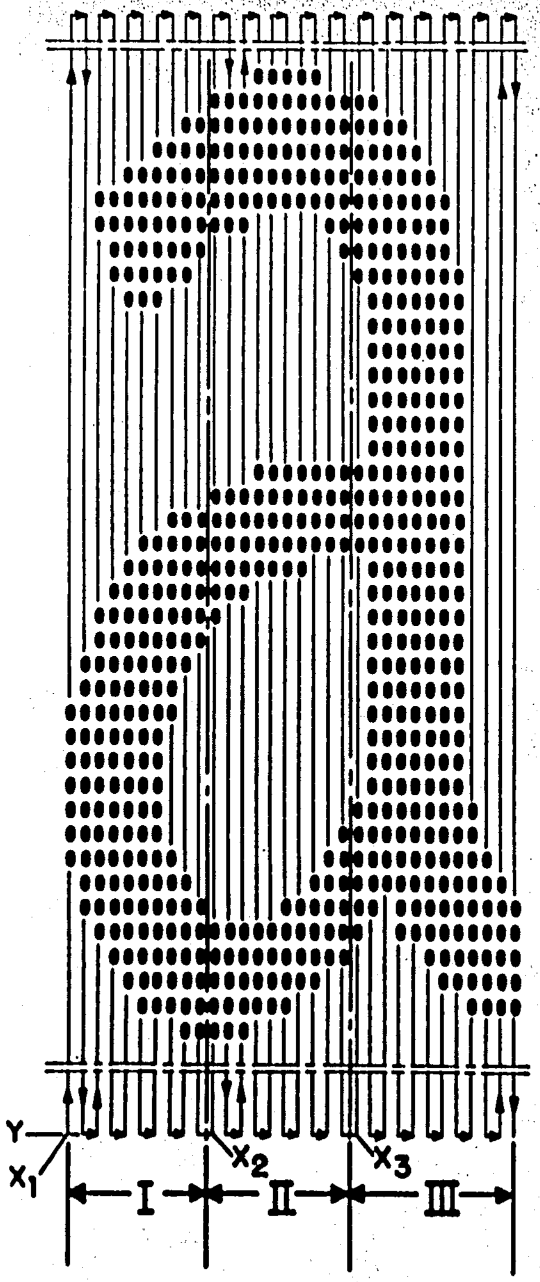
FIG. 4 shows the generation of a character by scanning the cathode ray tube beam in a raster fashion, and further showing the division of the character into three sections.

Referring now to FIG. 4, the letter *a* is shown being developed by scanning the beam with a cathode ray tube in a raster scan sequence and by gating the beam on at the places indicated by the black dots, such as done in the character generator described in the above mentioned U.S. patent application Ser. No. 591,734. The character has been divided into three sections, indicated by the numerals I, II and III, with the coordinates of the start of section I falling on the base line Y, and with the horizontal position indicated at $X_1$. The starting coordinates for sections II and III also are on the base line Y and are identified at $X_2$ and at $X_3$. It is understood that the scanning lines shown in FIG. 4 extend beyond that character and for this reason breaks in the scanning lines has been indicated in the figure. The scanning lines must necessarily include the characters which extend below the base line, such as the letters *j* and *y*, and also those which extend above the uppermost limits of the letter *a* shown, such as the letteds *d* and *b*. Thus, in the generation of the letter *a* shown in FIG. 4, it is necessary to know only the X coordinates for each of the sections being generated since the Y coordinate can be the same for all characters in a font.

Figures 5, 6:
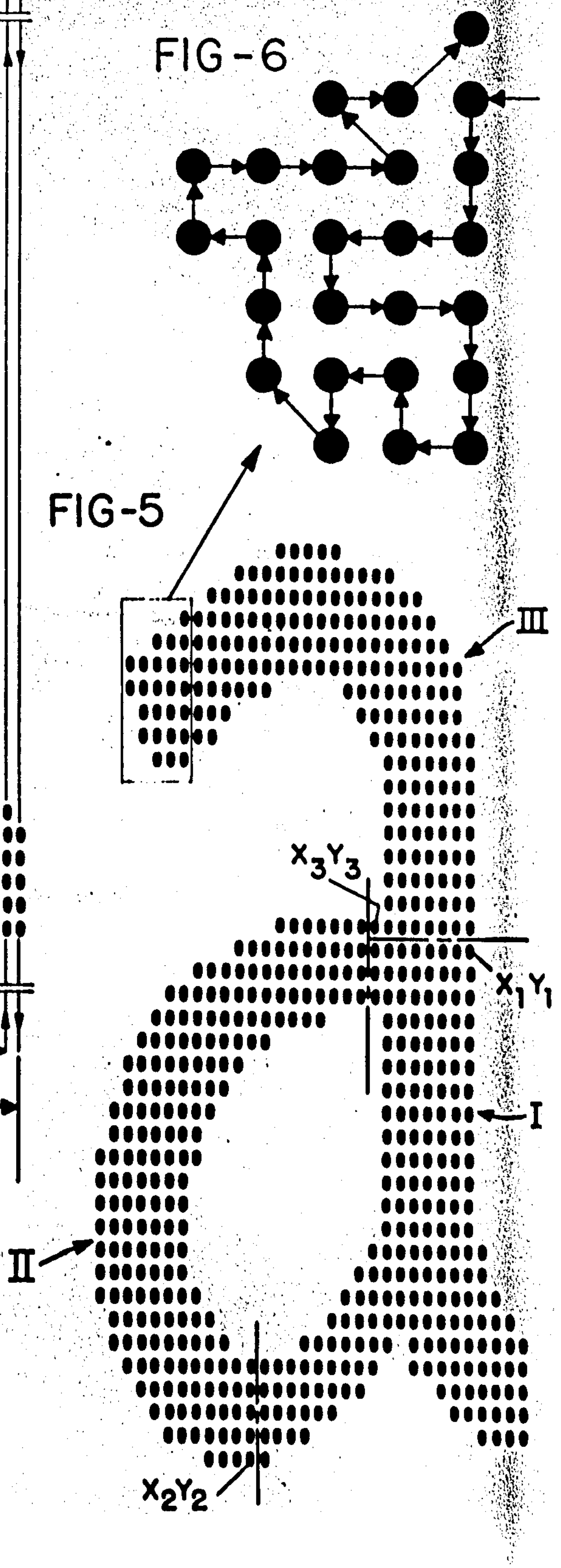
FIG. 5 shows a character created by moving the cathode ray tube beam from point to point which has been divided into three sections.
FIG. 6 is an exploded view of a portion of the character shown in FIG. 5, showing the generation of a character by moving the cathode ray tube beam from point to point.

The character *a* shown in FIG. 5 is also divided into three sections indicated by the numerals I, II and III. This character is generated by moving the cathode ray tube beam from point to point as directed by the digital information contained within the character track 40 and by gating the beam on at the places indicated by the black dots in FIG. 5. FIG. 6 is a detailed view of a portion of the character shown in FIG. 5 and illustrates the path taken by the cathode ray tube beam in generating the character. With this type of character generation, both the X and Y coordinates of the section relative to the remaining sections of the character are supplied. Thus, the starting coordinates for section I are indicated at $X_1$, $Y_1$, while the starting coordinates for section II are indicated at $X_2$, $Y_2$, and the starting coordinates for section III are indicated at $XX_3$, $Y_3$.

Figure 7A:
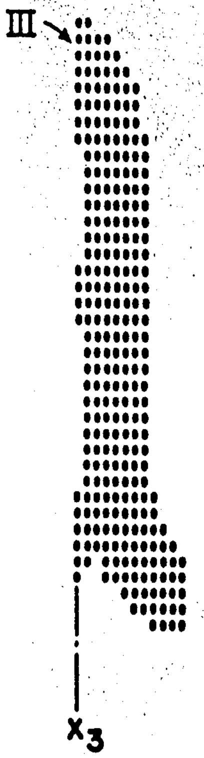
FIG. 7 illustrates the development of a character of FIG. 4 by scanning the cathode ray tube in a raster pattern with one section of the character being shown in FIG. 7*a* as solid black dots, another section shown being developed in FIG. 7*b* as solid black dots with the previously formed section shown as dashed lines, and FIG. 7*c* showing the remaining section of the character being developed as solid black dots while the two previously formed sections are shown as dashed lines.
Figure 7B:
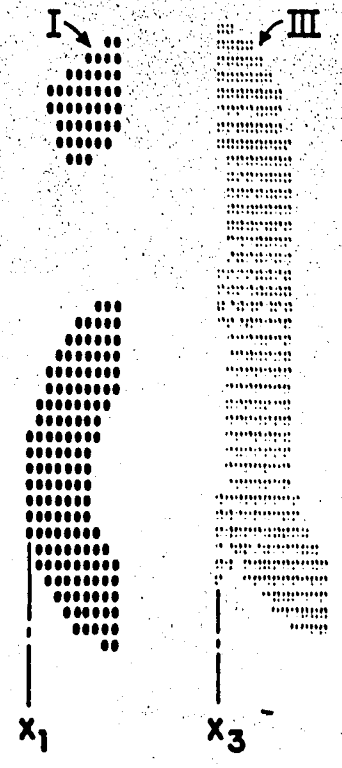
Figure 7C:
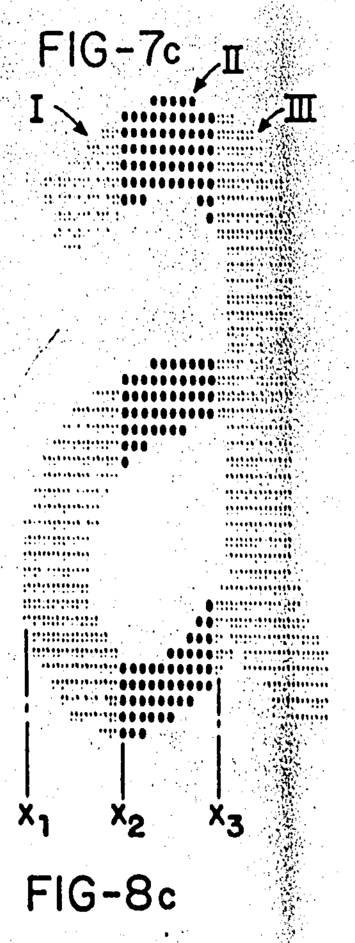

Referring now to FIG. 7 which illustrates the generation of the character shown in FIG. 4 by the raster scan method, it will be seen that if, at the time the character was selected, the first section to appear before the pickup device were section III, that section would be generated on the cathode ray tube, as shown by the solid black dots in FIG. 7a. Of course, the position of the cathode ray tube beam from its normal rest position must be modified so that section III will be generated in its proper position with respect to the remainder of the character. Therefore, the beam is moved from its initial starting position to the position $X_3$ where character generation is begun. Thereafter, the data in section I will be sensed by the pickup device and that section will be generated as shown by the solid dots in FIG. 7b, while section III, previously formed, is shown as dashed lines. After section I has been generated, the information in section II will then be sensed by the pickup means 13 and that portion of the character generated, as shown in the solid dots in FIG. 7c. Here again, those sections which have been previously formed are shown as dashed lines.

Figure 8A:
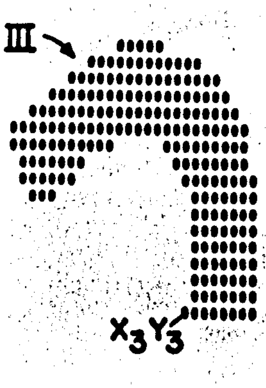
FIG. 8 illustrates the development of the character of FIG. 5 with the first section being developed in FIG. 8*a* and shown as solid black dots, another section being developed as solid black dots in FIG. 8*b* with the previously formed section shown as dashed lines, and the remaining section of the character being shown in FIG. 8*c* as solid black lines with the two previously formed sections shown as dashed lines.
Figure 8B:
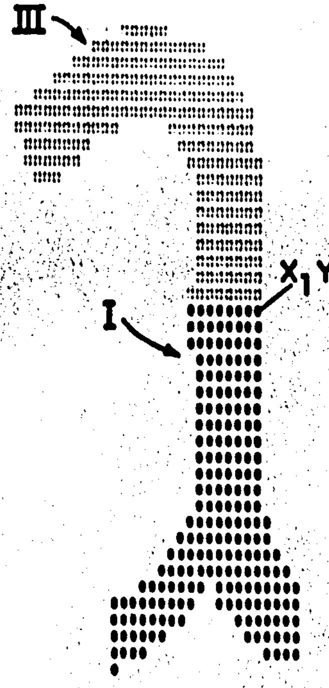
Figure 8C:
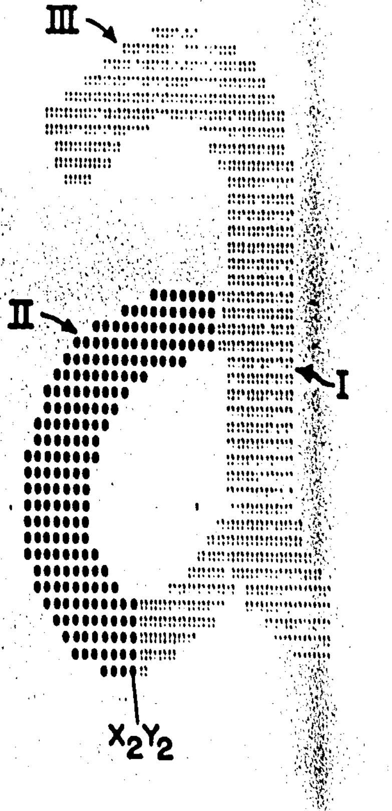

The character shown in FIG. 5, formed by moving the cathode ray tube beam from point to point, may also be divided into a plurality of sections. Thus, section III may be generated first, starting at position $X_3$, $Y_3$, as shown in FIG. 8a, followed by the generation of section I at $X_1$, $Y_1$, shown as the solid dots in FIG. 8b, and then the generation of section II at $X_2$, $Y_2$, shown as the solid dots in FIG. 8c.

It is apparent that more rapid access to the character information within a character track may thus be accomplished by dividing the character into several sections and reproducing the character in any sequence of sections required to form a complete character. It is necessary therefore for the character memory member to move through only a relatively small angular distance in order to arrive at a point where the character generation can begin, thus increasing the rate at which characters can be generated.

While the character information is described as being recorded in a single discrete track in serial form, it is understood that this information may be recorded equally as well in parallel form in a plurality of tracks, usually adjacent each other. As long as the parallel tracks are functionally related to each other to provide the necessary information to represent a single character, they may be grouped together and are regarded as a single discrete track in this appliaction.

The basic concept of repeating invariant data, such as the digital information representing alphanumeric characters, and dividing that digital information into a number of sections to improve the accessibility to the data may also be extended to the recording of other forms of invariant data, such as mathematical tables, including but not limited to logarithmic and trigonometric tables, for use in special purpose computers. Accordingly, the term "character," as used in this application, is defined to include any digital information representing invariant data which may be repeated several times on a cyclically moving storage member when rapid access to that information is required. In the case of mathematical tables, each character, as for example the several numerals expressing the value for the sine of 37°, would be divided into a number of sections for rapid access, and each section would be preceded with a code indicating the beginning of that section and its relationship to the remainder of the sections forming that character.

While the form of apparatus herein described constitutes a preferred embodiment of the invention, it is to be understood that the invention is not limited to this precise form of apparaus, and that changes may be made therein without departing from the scope of the invention.

What is claimed is:

1. An optical character storage member for use in an apparatus wherein a beam of energy is moved to form a character, said storage member including:

an optically transparent member having digital information permanently stored thereon as optical marks for the subsequent generation of characters;

at least one discrete track on said storage member for each character;

optical marks representing character data for the generation of a single character digitally stored in each track in a repeated sequence for the rapid recovery of the digital information representing that character;

said optical marks representing character data stored in each repetition in said discrete track being divided into a plurality of sections for the further rapid recovery of the digital information representing the characters; and other optical marks representing non-character data associated with the beginning of each of said sections indicating the coordinates of the relative position of that section with respect to the remainder of the character for positioning the beam prior to the generation of that section thus permitting the creation of a character from any sequence of sections making up a complete character.

2. The character storage member defined in claim 1 wherein said optical marks representing non-character information are included at the beginning of each of said plurality of sections in the same discrete track as the optical marks representing character information.

3. The character storage member defined in claim 1 wherein said optical marks representing non-character information include a unique combination of marks indicating the beginning of each section.

4. The character storage member defined in claim 3 wherein said optical marks representing non-character information further include a unique combination of marks indicating the end of each section.

5. The character storage member defined in claim 1 wherein said optical marks representing non-character information further include optical marks identifying the number of sections required to generate a complete character thus permitting the number of sections into which the characters are divided to differ in each discrete track.

6. The character storage member defined in claim 1 further including means for converting into electrical signals digital information optically encoded on said character storage member, comprising:

light means directing light onto said optical storage member to illuminate a plurality of said discrete tracks;

a photoelectric transducer for each discrete track;

means receiving the image from said plurality of discrete tracks and directing each image to its corresponding photoelectric transducer; and means causing relative movement between said optical storage member and said means for receiving the image whereby electrical signals are produced by said photoelectric transducers in response to the information carried by said optically encoded member.

7. A character storage member for use in an apparatus wherein a beam of energy is moved to form a character, said storage member including:

means for storing digital information thereon for the subsequent generation of characters by moving said beam in a path determined by said digital information;

a discrete track on said storage means for each character to be generated;

digital character information stored in each track being divided into a plurality of sections for rapid access to the digital information representing that character; and digital information on said storage means representing noncharacter data associated with each of said sections for indicating the coordinates of the relative position of that section with respect to the remainder of the character to position the beam prior to the generation of that section thus permitting the generation of a character from any sequence of sections making up a complete character.

8. The character storage member defined in claim 7 wherein said digital character information stored in each of said discrete tracks including the number of sections making up a complete character is repeated about said track for rapid access to the digital information representing that character.

9. The character storage member defined in claim 7 wherein said storage means is optically transparent and wherein said digital information is placed on said storage member in the form of optical marks.

10. The character storage member defined in claim 9 wherein said optical marks are alternate light transmitting and light opaque areas.

11. The character storage member defined in claim 7 wherein said storage means is a magnetic member upon which may be recorded digital magnetic signals representing the digital character information and the digital non-character information.

12. An opeical character storage member for use in an apparatus when rapid access is required to invariant digital information, said storage member including:

an optically transparent member having invariant digital information permanently stored thereon as optical marks;

a discrete track on said storage member for each character;

optical marks representing character information stored in each track with the character in that track being divided into a plurality of sections providing for rapid access to the digital information representing that character; and other optical marks representing non-character information assolcated with each of said sections for indicating the beginning of that section and its relationship to the remainder of the sections forming that character thus permitting rapid access to the character information from any sequence of sections making up a complete character.

13. A character storage member for use in an apparatus when rapid access is required to invariant digital information, said storage member including:

a member having invariant digital information stored thereon;

a discrete track on said storage member for each character;

digital information representing character information stored in each track with the character in that track being divided into a plurality of sections providing for rapid access to the digital information representing that character; and other digital information representing non-character information associated with each of said sections indicating the beginning of that section and its relationship to the remainder of the sections forming that character thus permitting rapid access to the character information from any sequence of sections making up a complete character.

14. The character storage member defined in claim 13 wherein said digital information representing non-character information is included at the beginning of each of said plurality of sections in the same discrete track as the digital information representing character information.

15. The character storage member defined in claim 13 wherein said digital information representing non-character information include a unique digital code indicating the beginning of each section.

16. The character storage member defined in claim 15 wherein said digital information representing non-character information further include a unique digital code indicating the end of each section.

17. The character storage member defined in claim 13 wherein said digital information representing non-character information further include means identifying the number of sections required to generate a complete character thus permitting the number of sections into which the characters are divided to differ in each discrete track.

18. The character storage member defined in claim 13 wherein said storage means is optically transparent and wherein said digital information is placed on said storage member in the form of optical marks.

19. The character storage member defined in claim 13 wherein said storage means is a magnetic member upon which may be recorded digital magnetic signals representing the digital character information and the digital non-character information.

References Cited

UNITED STATES PATENTS

| | | | |
|---|---|---|---|
| 3,056,955 | 10/1962 | Dirks | 340—324 |
| 3,400,387 | 9/1968 | Appleton | 340—324 |
| 3,255,444 | 7/1966 | Houghton | 340—324.1 |

RALPH G. NILSON, Primary Examiner

C. M. LEEDOM, Assistant Examiner

U.S. Cl. X.R.

235—61.12; 340—324.1; 250—233